United States Patent [19]

Epstein

[11] 3,889,062

[45] June 10, 1975

[54] SYSTEM AND METHOD FOR COUPLING REMOTE DATA TERMINALS VIA TELEPHONE LINES

[75] Inventor: Barry M. Epstein, Dallas, Tex.

[73] Assignee: Action Communication Systems, Inc., Dallas, Tex.

[22] Filed: Oct. 2, 1972

[21] Appl. No.: 293,774

[52] U.S. Cl. .......... 179/2 DP; 340/172.5

[51] Int. Cl. .......... H04h 11/06

[58] Field of Search ...... 178/2 D, 66 A, 66 R, 58 R; 179/2 DP, 3, 4, 1 C, 2 C, 99; 340/172.5

[56] References Cited

UNITED STATES PATENTS

| | | | |
|---|---|---|---|
| 2,301,211 | 11/1942 | Hanley | 178/2 D |
| 2,306,203 | 12/1942 | Anderson | 179/81 R |
| 3,113,176 | 12/1963 | Doktor | 179/3 |
| 3,227,806 | 1/1966 | Kreuzer | 179/3 |
| 3,305,839 | 2/1967 | Looschen et al. | 179/2 DP |
| 3,351,919 | 11/1967 | Milford | 179/2 DP |
| 3,368,028 | 2/1968 | Windels | 340/172.5 |
| 3,505,474 | 4/1970 | Quatse | 179/2 DP |
| 3,524,935 | 8/1970 | Gonsewski | 179/2 DP |
| 3,544,721 | 12/1970 | Van Geen | 179/2 DP |
| 3,636,257 | 1/1972 | Dixon | 179/3 |
| 3,649,759 | 3/1972 | Buzzard | 179/2 DP |
| 3,684,832 | 8/1972 | Marguth | 179/2 DP |
| 3,700,814 | 10/1972 | Spraker | 179/2 DP |
| 3,716,835 | 2/1973 | Weinberg | 179/2 DP |

*Primary Examiner*—Kathleen H. Claffy
*Assistant Examiner*—Thomas D'Amico
*Attorney, Agent, or Firm*—Richards, Harris & Medlock

[57] ABSTRACT

The specification discloses a digital computer having an input-output terminal such as a teleprinter. Input apparatus on the teleprinter, such as a keyboard, may be operated to generate electrical digital signals for input to the computer and an output display on the teleprinter displays digital signals output from the computer. First and second switches are connected between the input apparatus and the computer, with a third switch being connected between the computer and the output display. An acoustic coupler includes a pair of spaced apart transducers for receiving the handset of a telephone set to enable coupling into a conventional telephone line. A first set of terminals is provided to connect the acoustic coupler to the first switch and to the output display and a second set of terminals is provided to connect the coupler to the second and third switches. When the acoustic coupler is connected to the first set of terminals, the coupler is operable to direct digital signals transmitted from a remote data terminal through the telephone lines to the computer and is further operable to direct digital data from the computer through the telephone lines to the remote terminal. Connection of the acoustic coupler to the first set of terminals thus allows the remote data terminal to be utilized by an operator to diagnose problems in the computer or to utilize the computer for operator training and the like. This method of interconnection allows both the operator of the teleprinter and the operator of the remote data terminal to view each other's data simultaneously, without modification of the computer. When the acoustic coupler is connected to the second set of terminals, the teleprinter is disconnected from the computer and the coupler directs digital signals from the input apparatus of the teleprinter through the telephone lines to a remote computer system and directs digital data from the remote computer system through the telephone lines to operate the output display of the teleprinter.

5 Claims, 7 Drawing Figures

SYSTEM AND METHOD FOR COUPLING REMOTE DATA TERMINALS VIA TELEPHONE LINES

FIELD OF THE INVENTION

This invention relates to computer data stations, and more particularly relates to a method and system for coupling a computer data station via a conventional communications link with a remote input/output data terminal.

THE PRIOR ART

During the development of digital computers, it was found that an important use of the computers was the control of the transmission and reception of messages and data over communication circuits. Because such communication control imposed extremely heavy demands upon the computer central processor's work load, specialized communications processors were developed. Due to their specialized nature, the connumication processor systems were able to provide more efficient and flexible direction of communications.

An example of such a communications processor system is the Telecontroller System manufactured and sold by Action Communication Systems, Inc., of Dallas, Tex. The Telecontroller System is a communications control system that directs the transmission and reception of digital messages and data over dedicated or dialup telephone lines. The Telecontroller System enables communication over a wide variety of data transmission rates, circuit characteristics, line conventions and terminals, and may be used in conjunction with a plurality of systems ranging from teletype terminals operating upon relatively slow speed dedicated telephone lines to highly sophisticated computer systems utilizing high speed CRTs or printers. For a detailed description of the construction and operation of the Telecontroller System, reference is made to the publication entitled "Operation and Maintenance Instructions for the Telecontroller," published April 1971 by Action Communication Systems, Inc., of Dallas, Tex.

Communication processors such as the Telecontroller System utilize a properly programmed general purpose computer for controlling the operation of a plurality of communication lines. Generally, the computer includes an input/output data terminal such as a computer console teleprinter having input apparatus such as a keyboard and an output display such as a printer. The input/output data terminal is utilized during normal operation of the computer to print out statistics concerning the operation of the communication processor system, such as the total number of messages sent and received by the system, inoperative stations and system loading factors and the like. In addition, an important aspect of the input/output data terminal is the activation of a diagnostic program within the computer system in order to enable a correction of malfunctions within the computer system. For example, an operator may input a control character through the input apparatus of the teleprinter to the computer to activate the diagnostic program. By then typing in desired memory locations, the storage within the memory locations is printed out upon the printer for review by the operator. By proper operation of the input apparatus, an operator may then modify the storage of the memory or may perform other corrective steps.

Inasmuch as the locations of such communication processors are widely dispersed, it becomes desirable to enable service personnel located remote from a communication processor to monitor and diagnose problems which occur in the communication processor. Additionally, it is desirable to enable programming changes in the communication processors, such as changes in tables and polling lists, to be remotely made without the delay and expense incurred by the travel of a programmer to the remote site. Moreover, it is desirable to provide a technique by which training of personnel for a new communication processor may be accomplished by utilizing an operating remote communication processor. It is also desirable to enable utilization of the input/output data terminal at a communications processor for training with or to diagnose problems existing in a remote communications processor.

In addition to the above-noted problems in communication processor installations, similar requirements for remote operation and diagnosis exist for many other types of computer systems, such as business data processing, process control, time sharing and the like.

SUMMARY OF THE INVENTION

In accordance with the present invention, a system is provided for coupling an input/output data terminal, typically the control console, at a computer station via a conventional telephone link with a remote input/output data terminal. Each of the data terminals are coupled to the telephone link such that inputs from each of the data terminals are directed to the computer and such that outputs of each of the data terminals are concomitantly controlled by output signals from the computer. In addition, the apparatus for coupling is operable to allow voice communication between operators at the spaced apart data terminals.

In accordance with another aspect of the invention, an input/output data terminal for a computer includes input apparatus and an output display. The computer is operable to receive input signals from the input apparatus and to control the operation of the output display. Apparatus is provided to couple the computer and the data terminal to a conventional telephone channel, such that the computer may receive input signals from a remote data terminal and may control the output of the remote data terminal in addition to controlling the operation of the output display of the near data terminal.

In accordance with another aspect of the invention, a data terminal having input apparatus and an output display is connected to a computer system. The computer system is operable to receive input signals from the input apparatus and for controlling the operation of the output display. Apparatus is provided to couple the input apparatus and the output display through a conventional telephone channel to a remote data terminal. Circuitry interrupts the connections between the computer and the data terminal while substituting an alternate input connection to the computer to prevent interruption of the operation of the computer.

In accordance with yet another aspect of the invention, a method of interconnecting a computer data station with a remote data terminal includes establishing a telephone link between the computer data station and the remote data terminal location to enable voice communication therebetween. Digital data generated by the remote data terminal is then transmitted over the telephone link to the computer data station. Digital control signals are then generated from the computer in response to the digital data. Representations of the digital control signals are transmitted via the telephone link to control the output of the remote data terminal.

In accordance with a more specific aspect of the invention, a communications processor station includes a teleprinter having input apparatus for generating digital signals and further having an output display. A digital communication processor computer receives the digital signals and in response thereto controls the operation of the output display. First and second switches are connected between the input apparatus and the computer. A third switch is connected between the computer and the output display. An acoustic coupler includes transducers for receiving the handset of a telephone set in order to acoustically couple to a telephone line. Terminals are provided for connecting the acoustic coupler to the first switch and to the output display, or alternatively for connecting the acoustic coupler to the second and third switches. When the acoustic coupler is connected to the first switch and the output display, the coupler is operable to direct digital signals transmitted from a remote terminal through the telephone lines to the computer and is further operable to direct digital data from the computer through the telephone lines to the remote terminal. When the acoustic coupler is connected to the second and third switches, the coupler is operable to direct digital signals from the input apparatus through the telephone lines to a remote terminal and is further operable to direct digital signals from the remote terminal through the telephone lines to operate the output display.

In yet a more specific aspect of the invention, a communication processor station includes a teleprinter having an input keyboard and an output printer. A digital communication processor computer is operable to receive digital signals from the teleprinter input keyboard and in response thereto to operate the output printer. A first relay includes a relay coil connected between circuit ground and a first terminal and having a switch element connected between the input keyboard and the computer. A lead interconnects the computer and the output printer to a second terminal. A second relay includes a selectively operable relay coil and includes second, third and fourth switch elements. The second switch element is connected between the input keyboard and the computer and is operable to disconnect the input keyboard and the computer and to connect the input keyboard to a third terminal. The third switch element is connected between the input keyboard and the computer and is operable to disconnect the input keyboard and the computer and to connect a proper termination in its place to the computer. The fourth switch element is connected between the computer and the output printer and is operable to disconnect the computer from the output printer and to connect the output printer to a fourth terminal. An acoustic coupler includes a first transducer for transducing digital signals into audio signals and a second transducer for transducing audio signals into digital signals. The acoustic coupler is operable to receive the handset of a conventional telephone set and further includes input and output terminals operable for being connected to the first and second terminals to enable coupling of the teleprinter and the computer to a remote teleprinter. The input and output terminals of the acoustic coupler are also operable to be connected to the third and fourth terminals to enable connection of only the teleprinter to a remote data station.

DESCRIPTION OF THE DRAWINGS

For a more complete understanding of the present invention, and for further objects and advantages thereof, reference is now made to the following description taken in conjunction with the accompanying drawings, in which.

DESCRIPTION OF THE PREFERRED EMBODIMENT

Figure 1:
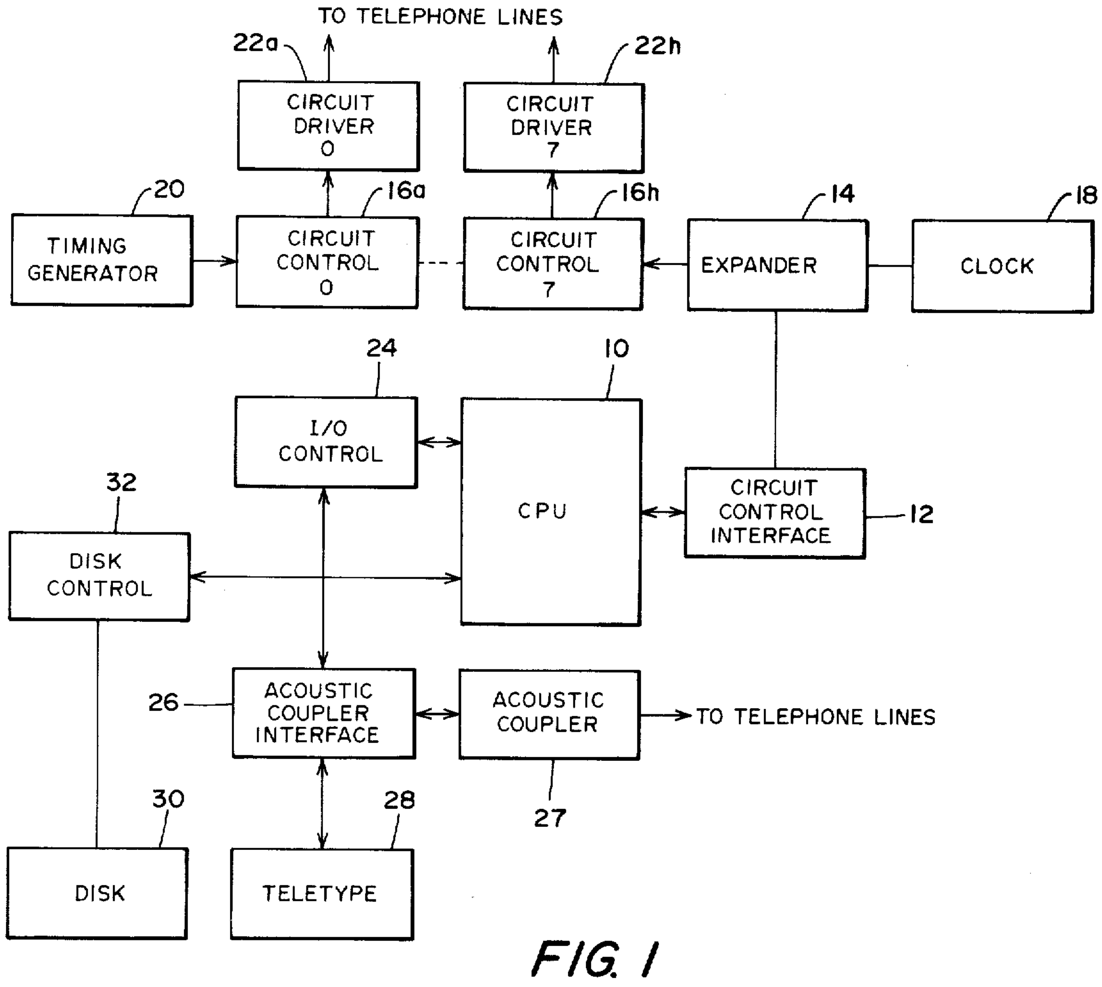
FIG. 1 is a block diagram of a communication processor system including the present acoustic coupling invention.

FIG. 1 illustrates a block diagram of a communications processor system incorporating the coupling system of the present invention. The communications processor system includes a central processor unit (CPU) 10 which may comprise any suitably programmed general purpose computer. For example, the Nova 1200 Digital Computer manufactured and sold by the Data General Corporation of Southboro, Mass., may be utilized. A detailed description of the construction and operation of the Nova computer is provided in the publication "How to Use the Nova and the Supernova," published May, 1970, by Data General Corporation.

The CPU 10 is properly programmed to provide all of the necessary input/output functions required to control communications over a plurality of telephone and teletype lines. Data is transferred to and from the CPU 10 through a high speed parallel data buss connected through a circuit control interface 12 and an expander 14 to a plurality of circuit controls 16*a–h*. Control signals are provided by the CPU 10 to enable a given circuit control 16*a–h* to decode its particular address, what type of transfers are to take place (input or output) and which one of the device registers within the circuit controls 16*a–h* are to be used. Each of the circuit controls 16*a–h* generally control a plurality of stations with their own unique Call Directing Codes (CPU) and Transmitter Start Codes (TSC). American Telephone & Telegraph 83B3 method of operation is often utilized for station control, although the system is compatible with many communication standards such as Western Union Plans 115 or 117, ASCII, EBCDIC, BAUDOT, BISYNC, SYNC, and the like. For a more detailed explanation of the 83B3 method, reference is made to the Bell System Data Communication entitled "Technical Reference, 83B3 Teletypewriter Selective Calling System," published September, 1967.

The circuit control interface 12 includes an address decoder to decode the device address for any teletype input/output. The circuit control interface 12 also includes input and output buffers for buffering data into and from the CPU 10. Logic is provided in the circuit control interface 12 to provide a data channel transfer of the time, as provided by a clock 18, directly into memory cells.

The expander circuit 14 drives circuit control data busses in each of the circuit controls 16*a–h*. The circuit controls 16*a–h* are timed by a timing generator 20 and contain logic for converting parallel data from the CPU data buss to serial data for the circuit drivers 22*a–h* which individually control telephone or teletype lines. The circuit controls 16*a–h* include shift registers for shifting data from and to the telephone or teletype lines. A data character is held in an output buffer in the control interface 12 until a shift register in the circuit control 16*a–h* is idle. The data character is then transferred on the next timing pulse from the timing generator 20 into the shift register within the circuit control.

The timing generator 20 utilizes a plurality of monostable multivibrators to provide clock enable and strobe signals for the circuit controls. The clock 18 contains decoders and drivers to drive a display for the system and also drivers and logic for placing the contents of the counters of the circuit on the high speed data buss upon receipt of control signals from the circuit control interface 12.

The communications processor shown in FIG. 1 is thus able to automatically invite individual terminals on the telephone lines controlled by drivers 22*a–h* to transmit traffic. The traffic is transmitted to the CPU 10, wherein the traffic data is checked for format validity and accuracy and is subsequently transmitted to the desired receiving terminal. In this manner, the processor provides for the most efficient use of the telephone and teletype lines, while providing important checks on the accuracy of the traffic. In addition, the processor checks to ensure that all major components of the system are functioning properly and generates statistical report data which is output to the input/output terminal.

For a more detailed description of the construction and operation of the Telecontroller System, reference is made to the publication entitled "Operation and Maintenance Instructions for the Telecontroller," published April, 1971 by Action Communication Systems, Inc., of Dallas, Tex.

In order to enable input and output to the CPU 10 for programming, diagnostic and control purposes, an input/output control 24 is connected to the CPU 10 and is connected through an acoustic coupler interface 26 to an acoustic coupler 27 and to an input/output data terminal such as a teletype 28. A suitable type of teletype for use with the present invention is the ASR33 Western Electric teletype. Storage for the CPU 10 is provided in a disc 30, the operation of which is controlled by a disc control 32.

The teletype 28 includes input apparatus such as a keyboard or a tape reader and an output display such as a mechanical printer or a cathode ray tube. During operation of the communication processor system, report data may be fed from the CPU 10 through the input/output control 24 to the printer of the teletype 28 in order to print out statistics regarding the amount of traffic handled by the system and the like.

Another important use of the teletype 28 is for diagnosing problems which occur in the operation of the Telecontroller System. A diagnostic program is contained in the CPU 10 and the program may be actuated by operation of the correct key on the teletype keyboard. For example, depression of a particular control character key on the keyboard activates the diagnostic program. Thereafter, the operator may type out particular memory characters representative of memory locations within the CPU 10 and disc 30, the CPU 10 responding such that the storage in a particular memory location is typed out on the printer of the teletype 28. If it is desired to change the storage within a particular memory location, the memory may be modified by typing out the particular characters on the teletype keyboard. In addition, the operator may operate the keyboard of the teletype 28 in order to change particular operations of the CPU 10, such as changing the polling list within the CPU and the like.

In many circumstances, it is desirable to enable a particular operator or programmer to remotely input and output to the CPU 10. For example, it may be desirable to utilize a remote communication processor to train an operator at a location which does not have a communication processor. More importantly, in case of operational problems with the CPU 10 or if changes in the operation of the CPU 10 are desired, it is often necessary to utilize the services of an expert service programmer and operator who is remotely located in a distant city. It is thus desirable to enable such an expert service programmer and operator to remotely operate and communicate with the CPU 10 in order to eliminate time-consuming and expensive travel to the communication processor location. The provision of the acoustic coupler interface 26 and the acoustic coupler 27 shown in FIG. 1 may be utilized to provide such remote operation of a communication processor, as is shown in more detail in FIG. 2.

Figure 2:
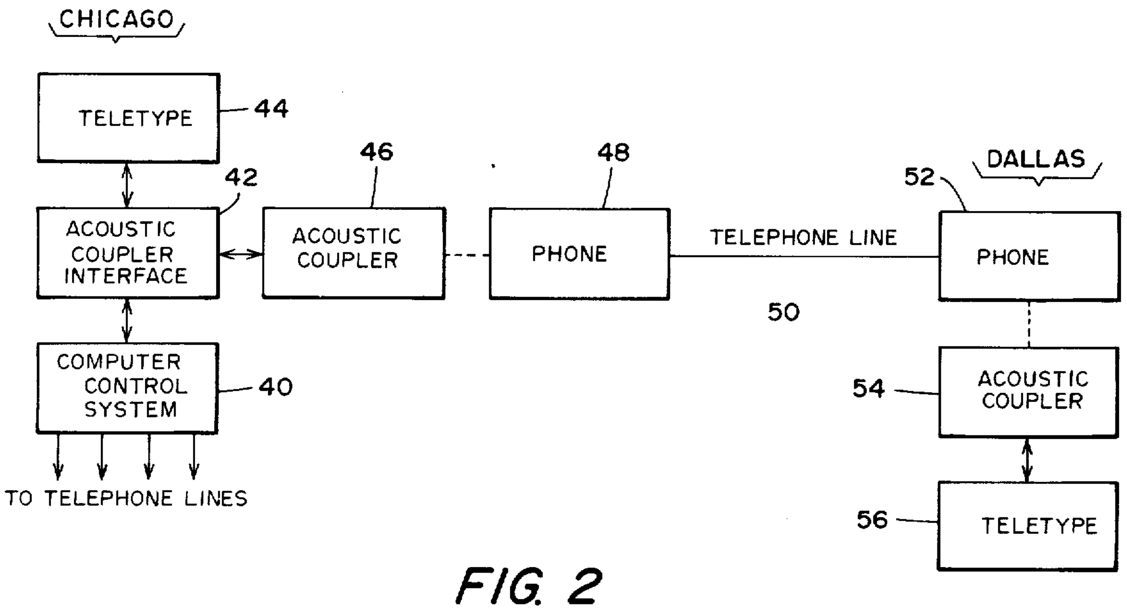
FIG. 2 is a block diagram of the use of the present invention in conjunction with a communication processor and a remote teletype.

FIG. 2 illustrates one mode or operation of the present acoustic coupling technique. For purposes of illustration, it will be assumed that a communications processor is located in Chicago, Illinois, and a programmer desiring to operate the communications processor is located in Dallas, Tex.

The communications processor located in Chicago, Illinois, includes a computer control system 40 which includes a CPU and storage for control of the reception and transmission of teletype signals over a plurality of leased telephone lines. An acoustic coupler interfaces 42 couples the input and output of the computer control system with an input terminal such as a teletype 44. The acoustic coupler interface 42 is connected to an acoustic coupler 46 which is operable to receive and transmit tone data through the handset of a conventional telephone 48. Tone data may then be transmitted through the telephone line 50 to the handset of a telephone set 52 located at the Dallas location. The Dallas location includes an acoustic coupler 54 for receiving and transmitting data through the telephone handset. An input data terminal such as a teletype 56 is connected to the acoustic coupler.

In operation of the system in FIG. 2, in case of operational problems of the communications processor at Chicago, the Chicago operator picks up the handset of the telephone set 48 and dials the telephone number of the Dallas, Tex. station. An operator at the Dallas location picks up the handset of the telephone set 52 and establishes voice communication with the Chicago location. The Chicago operator informs the Dallas operator of the nature of the operational problems. The operators at both locations then place the handset of their telephone sets into the respective acoustic couplers 46 and 54.

As is well known, acoustic couplers include two transducers spaced apart to receive the mouthpiece and earpiece of a conventional telephone handset. The transducer which receives the mouthpiece receives electrical signals from the teletype 56, converts the electrical signals into tone signals and couples the tone signals through the mouthpiece of the handset to the telephone line 50. The transducer located at the earpiece receives tone signals from the earpiece and converts the tone signals into electrical signals for operation of the printer of the teletype 56. Thus, electrical signals generated from each of the Chicago and Dallas stations are converted into tone signals, transmitted over the telephone line 50 and converted back into electrical signals.

Once the handsets of the telephone sets 48 and 52 are placed on the acoustic couplers 46 and 54, the keyboards of both teletypes 44 and 56 are connected in series via the relay 78 to the input of the computer control system 40. The keyboards of either of the teletypes 44 and 56 may then be operated to input digital signals into the computer control system 40. Similarly, the printers of both the teletypes 44 and 56 are connected in parallel to the output of the computer control system 40. Thus, statistical data generated by the computer control system 40 is printed on the printer of the teletype 44 and on the printer of the teletype 56. Likewise, diagnostic data which is output from the computer control system 40 is printed upon the printer of the teletype 44 and on the printer of the teletype 56.

In this manner, the operator at the Dallas station is able to operate the keyboard of the teletype 56 to generate electrical control characters which are coupled through the acoustic coupler 54 and are converted into tone signals. The tone signals are acoustically coupled through the handset of the telephone 52 and are transmitted through the telephone line 50 to the handset of the telephone 48 in Chicago. The tone signals are coupled to the acoustic coupler 46 and are converted into electrical signals. The electrical signals are then applied through the acoustic coupler interface to the computer control system 40. In response thereto, the computer control system generates digital electrical signals which are applied through the acoustic coupler interface 42 to the acoustic coupler 46. The electrical signals are converted into tone signals and are applied through the telephone 48 and through the telephone line 50 to the telephone set 52. The tone signals are then converted by the coupler 54 into electrical signals which are applied to control the printer of the teletype 56. The operator at the Dallas station may then inspect the operation of the communications processor in Chicago and may diagnose operational troubles and generate corrective inputs to the computer control system 40.

In a like manner, if it is desired to allow a trainee in Chicago to learn the operation of the communications processor in Chicago under the supervision of the Dallas station, the system shown in FIG. 2 is utilized in the manner previously described, except that the Chicago trainee places the intial long distance telephone call to the operator in Dallas. After initial discussion, the handsets of the telephones are placed in the acoustic couplers 46 and 54 and the Chicago trainee may then operate the communications processor located in Chicago. The expert programmer in Dallas is able to see the results of the long distance operation on the printer of his teletype on a substantially real time basis.

Figure 3:
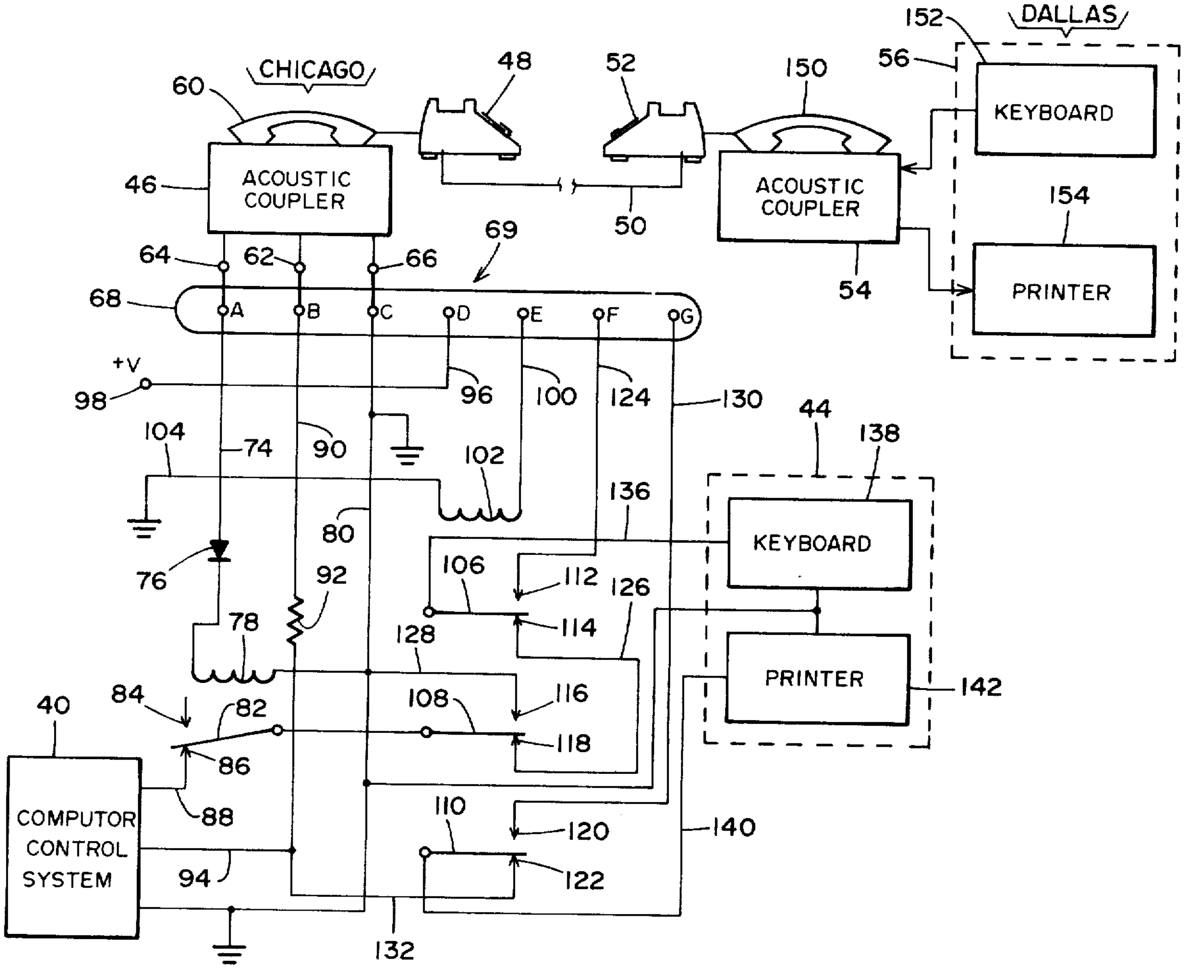
FIG. 3 is an electric schematic of the present invention when interconnected according to the block diagram shown in FIG. 2.

FIG. 3 illustrates in schematic detail the system shown in FIG. 2. Like numbers are utilized for like and corresponding parts of the systems shown in FIGS. 2 and 3. The acoustic coupler 46 contains depressions for receiving the mouthpiece and earpiece of the handset 60 of the telephone set 48. As previously noted, the acoustic coupler 46 may comprise any of a number of conventional acoustic couplers. For example, a typical acoustic coupler is disclosed in U.S. Pat. No. 3,553,374, issued to Wolfe on Jan. 5, 1971. Such acoustic couplers contain tone generators for receiving electrical signals and for generating tones in response thereto. The tones are then coupled through a microphone or the like to the mouthpiece of the handset 60. The acoustic coupler 46 also includes a transducer for receiving tone signals from the earpiece of the handset 60. The transducer may, for example, comprise a pickup coil for detecting the acoustic energy generated from the earpiece of the handset 60 and for converting the acoustic energy into electrical signals. The input of the acoustic coupler comprises a terminal 62 which is adapted to receive electrical signals. The output of the acoustic coupler 46 comprises a terminal 64 on which appears electrical signals generated from the coupler 46. A third terminal 66 of the coupler 46 is connected to circuit ground.

Figure 7:
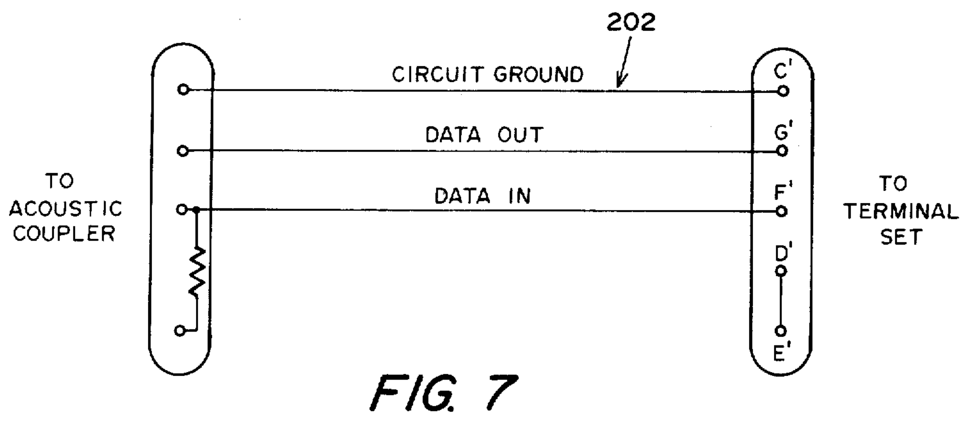
FIG. 7 is a representation of the electrical cable utilized to interconnect an acoustic coupler with a teletype in the manner shown in FIG. 6.

The acoustic coupling interface of the system includes a set of seven terminals 68A–G. To utilize the system in the manner shown in FIG. 2, the output terminal 64 of the coupler 46 is connected to terminal A, while the input terminal 62 is connected to terminal B. The terminal 66 is connected to the ground terminal C. For ease of connection of the system in the desired manner, it has been found desirable to provide the acoustic coupler cable 69 shown in FIG. 4. The cable 69 contains a terminal connector 70 which is adapted to interconnect with terminals 62, 64, and 66 of the acoustic coupler. Coupler cable 69 also includes a terminal connector 72 which is configured such that it can only be connected in the desired manner with terminals A, B and C of the set of terminals 68. The provision of the acoustic coupler cable 69 shown in FIG. 4 prevents an untrained user from interconnecting the acoustic coupler 46 in an incorrect manner. A second acoustic coupler cable, shown in FIG. 7, is provided to enable interconnection of the present system for use in a second mode, to be later described.

Terminal 68A is connected through a lead 74 and a diode 76 to a terminal of a relay coil 78. The remaining terminal of the relay coil 78 is connected through a lead 80 to terminal C and circuit ground. Relay coil 78 controls the movement of a relay switch element 82 between contacts 84 and 86. Contact 86 is connected via a lead 88 to the input of the computer control system 40. Terminal 68B is connected through a lead 90, a resistor 92 and through a lead 94 to the output of the computer control system 40.

Terminal 68D is connected via a lead 96 to a terminal 98 which is connected to a source of positive potential. Terminal 68E is connected via a lead 100 which is connected to a second relay coil 102. Relay coil 102 is connected to circuit ground via a lead 104. Three relay switch elements 106, 108 and 110 are controlled by the relay coil 102. Switch element 106 is movable between contacts 112 and 114, switch element 108 is movable between contacts 116 and 118, and switch element 110 is movable between contacts 120 and 122. Contact 112 is connected to terminal 68F via the lead 124. Contact 114 is connected to contact 118 via lead 126. Contact 116 is connected to circuit ground via lead 128. Contact 120 is connected to terminal 68G via lead 130. Contact 122 is connected via lead 132 to lead 94 and to one terminal of the resistor 92.

Switch element 106 is connected via lead 136 to the output of the keyboard 138 of the teletype 44. Switch element 108 is directly connected to the switch element 82. Switch element 110 is connected via lead 140 to the input of the printer 142 of the teletype 44.

When a telephone link between the remote stations is established, telephone set 48 is connected through a telephone line 50 to the telephone set 52. The handset 150 of the telephone set 52 is placed upon the acoustic coupler 54 in the manner previously described. The input of the acoustic coupler 54 is directly coupled to the keyboard 152 of the teletype 56. The output of the acoustic coupler 54 is directly coupled to the printer 154 of the teletype 56.

The acoustic coupler 46 is generally maintained in the answer mode and the acoustic coupler 54 is the orginate mode. These modes may be set by operation of switches on the couplers, such that the frequencies transmitted and received by the couplers are matched. The coupler 54 is maintained in the originate mode to eliminate continuous spacing operation of the teletype 56 while awaiting input from a remote station.

In operation of the system shown in FIG. 3, when an operator at the computer control system 40 desires assistance by a service operator or programmer at a remote location, a long distance telephone call is placed to the telephone set 52. Upon answering, the operator at the remote station is informed of the problems existing at the computer control system 40. To allow diagnostic tests to be conducted by the remote operator, the handset 60 is placed upon the acoustic coupler 46 and handset 150 is placed upon the acoustic coupler 54. In this manner, the keyboard 152 and printer 154 of the teletype 56 are intercoupled with the computer control system 40. Depression of a key on the keyboard 152 generates an electrical digital signal which is applied to the acoustic coupler 54. The electrical signal is converted into tone signals which are applied through the mouthpiece of the handset 150 and are transmitted through the telephone line 50 to the earpiece of the handset 60.

The tones generated from the earpiece of the handset 60 are detected by the acoustic coupler 46 and are converted into electrical digital signals. The electrical signals are fed from terminal 64 through lead 74 and diode 76 to the relay coil 78. The purpose of the diode 76 is to terminate current flow through the relay coil 78 when the voltage signal applied by the acoustic coupler goes negative (or zero), such that the relay switch element 82 closes with contact 86. When the voltage applied on lead 74 from the acoustic coupler 46 goes positive, current is applied through the coil 78 in order to cause the switch element 82 to open against contact 84.

Since in this mode of operation no connections are made to terminals 68D, E, F and G, the relay coil 102 is deenergized and the switch elements 106, 108 and 110 are open in the manner illustrated in FIG. 3. Thus, switch element 82 is connected through switch element 108, lead 126, switch element 106, and lead 136 to the output of the keyboard 138. It may thus be seen that operation of the keyboard 152 causes operation of the relay coil 78 in order to make and break the input to the computer to transmit representations of the digital signals generated by the keyboard 152 into the input of the computer control system 40. The computer control system 40 senses the digital signals applied from the keyboard 152 and in response thereto generates information on the output lead 94. In a similar manner, operation of the keyboard 138 may be utilized to control the computer control system 40 in a conventional manner when the keyboard 152 is not being operated.

The output signals applied on lead 94 from the computer control system 40 are applied through the resistor 92 to the input of the acoustic coupler 46. The digital electrical signals are converted into tone signals and are transmitted through the mouthpiece of the handset 60 and through the telephone line 50 to the remote station. The tone signals are then coupled from the handset 150 to the acoustic coupler 54 and are converted into digital electrical signals for application to the printer 154. The printer 154 is operated to print out the diagnostic data generated by the program within the computer control system 40. Since no current is applied to the relay coil 102, the output of the computer control system is directly connected with the printer 142 via lead 94, lead 132, switch element 110 and lead 140. Thus, the printer 142 is operated concomitantly with the operation of the remote printer 154. Operators at both the near station and the remote station may then watch the operation of the computer and may later pick up the handset 60 and 150 in order to discuss any operational problems with the system.

In an alternate mode, when an operator at the remote station desires to remotely operate the computer control system 40, the operator places a telephone call to the operator at the computer control system 40. After discussion between the operators, the handsets 60 and 150 are placed upon the acoustic couplers and the operator may then proceed to control the computer control system by operation of the keyboard 152 and may watch the results of his operation at the printer 154.

Figure 5:
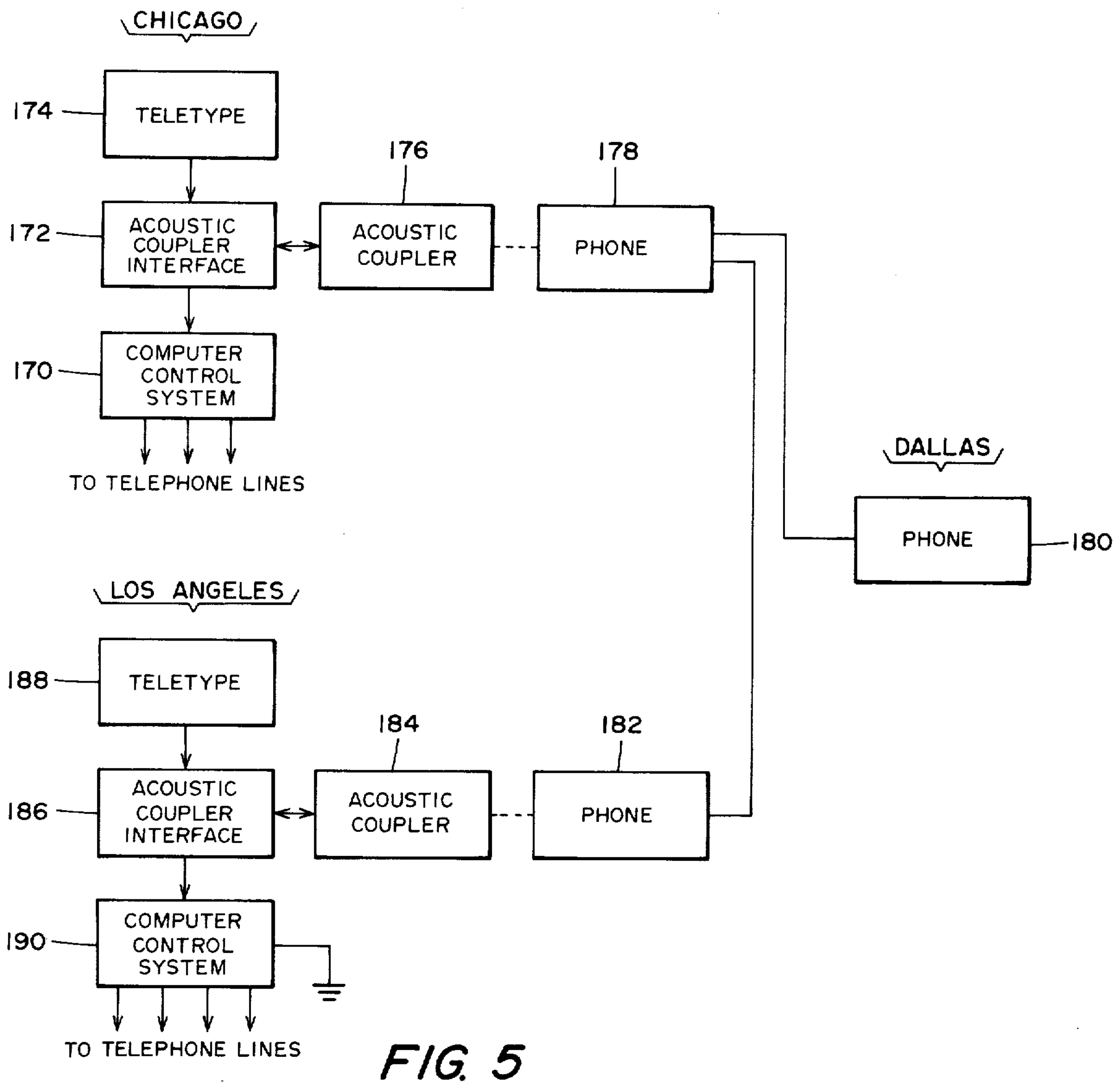
FIG. 5 is a block diagram illustrating the use of the present invention to enable a teletype at one communication processor location to control a second remote communication processor.

FIG. 5 illustrates the operation of the present system in a second primary mode. It will be assumed that a communications processor is located in Chicago, Ill., and operational problems occur which cannot be diagnosed by onsite personnel. A telephone call is placed to the central maintenance station at Dallas, Tex., in an effort to obtain diagnostic assistance. In this instance, however, the expert programmer and operator best suited to provide the diagnosis is working upon a second communications processor located in Los Angeles, Calif. With the use of the present system, the expert programmer may be contacted and a communications and control link may be established between Chicago and Los Angeles to enable the expert programmer to provide diagnosis to the Chicago communications processor. In addition, the present system enables the use of the input/output data terminal at the Los Angeles communications processor to be utilized as an input and output data terminal for the Chicago communications processor, in order that the expert programmer and operator is not required to carry a separate data terminal with him on such trips. With the present system, the Los Angeles data terminal may be used for this purpose without hampering the continued operation of the Los Angeles processor system.

Specifically referring to FIG. 5, the communications processor at the Chicago location comprises a computer control system 170 including a CPU which controls a plurality of leased telephone lines for the transmission and reception of teletype signals. An acoustic coupler interface 172 interconnects a teletype 174 with the computer control system and with an acoustic type 174 with the computer control system and with an acoustic coupler 176. The coupler 176 is adapted to receive the handset of a telephone set 178 in the manner previously described. The telephone set 178 may be utilized to contact the Dallas location through a telephone set 180. Likewise, the telephone set 178 may be utilized to contact the Los Angeles location by use of the telephone set 182. An acoustic coupler 184 receives the handset of the telephone set 182 and is connected to an acoustic coupler interface 186. A teletype 188 is connected through the interface 186 to the acoustic coupler 184 and to a computer control system 190. The control system 190 controls the transmission and reception of teletype signals over a plurality of telephone lines in a similar manner as the system shown at the Chicago location.

In operation of the system shown in FIG. 5, if a malfunction occurs at the Chicago location, a long distance telephone call is placed between telephone sets 178 and 180. Upon learning that the programmer is in Los Angeles, the call between Chicago and Dallas is terminated and a long distance call is placed to the expert programmer at the Los Angeles location. After an initial discussion of the operational problems at the Chicago location, the handset of the telephone set 178 is placed upon the acoustic coupler 176 and the handset of the telephone set 182 is placed upon the acoustic coupler 184. The acoustic coupler 184 is interconnected through the acoustic coupler interface 186 in such a manner that the teletype 188 is disconnected from the computer control system 190 and is connected directly to the acoustic coupler 184. The input to the computer control system 190 is shorted to circuit ground such that the computer control system 190 may continue operating the leased telephone lines as if the teletype 188 were still connected.

The expert programmer may then input characters via the teletype 188 and may transmit the characters to the Chicago location in order to diagnose problems within the computer control system 170. Output from the computer control system 170 are printed out upon the printer of the teletype 188 in the manner previously noted. After correction of the problems at the Chicago location, the telephone link between the telephone sets 178 and 182 is terminated and the teletype 188 is reconnected to the computer control system 190.

In case it is desired to enable training of an inexperienced operator at the Los Angeles location by utilizing the Chicago communications processor, a telephone call is placed from the Los Angeles location directly to Chicago and the acoustic coupling link enables the teletype 188 to be utilized as an input/output data terminal in conjunction with the Chicago-based communications processor.

Figure 6:
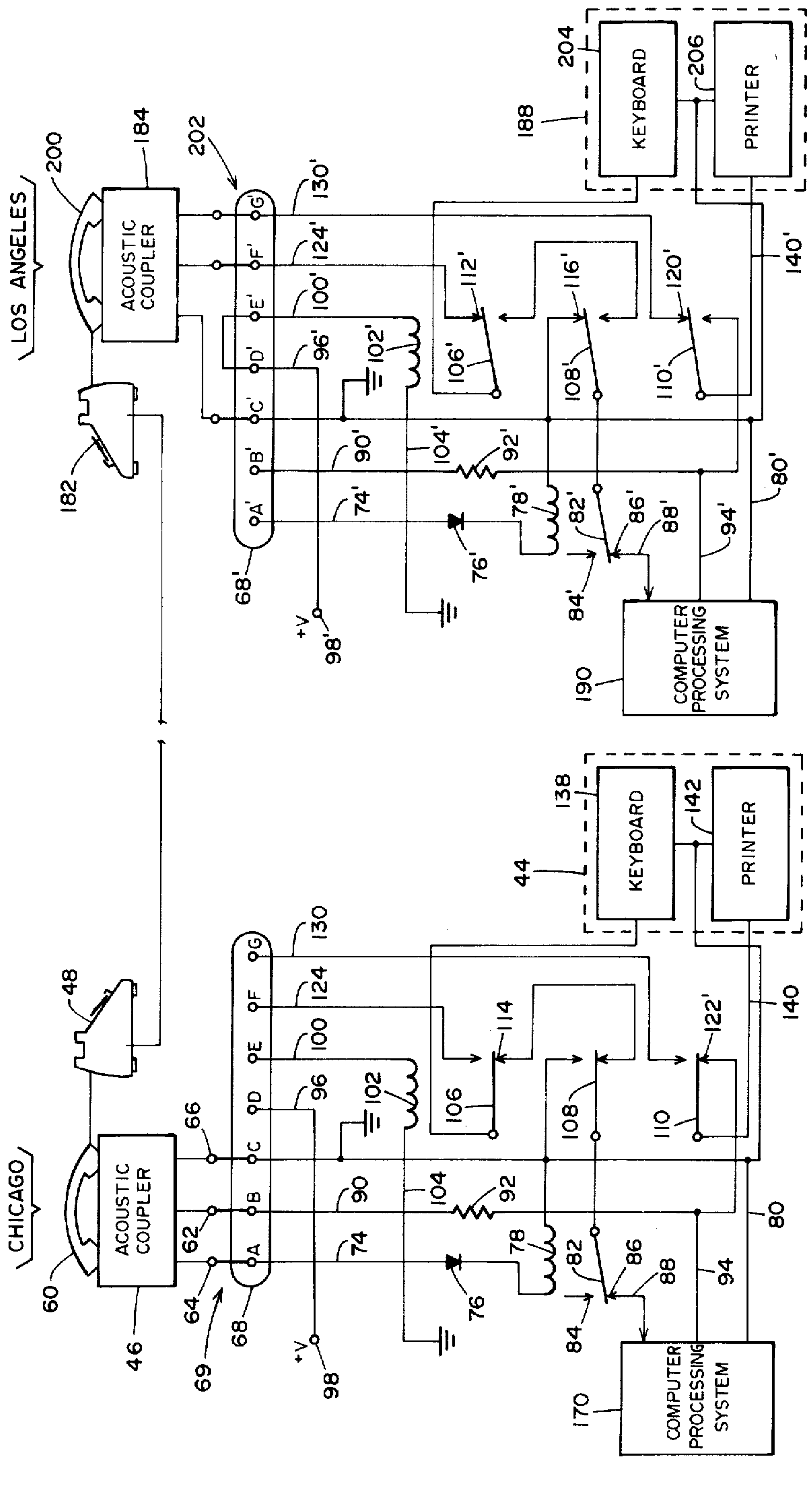
FIG. 6 is an electrical schematic of two systems according to the present invention interconnected in the manner shown in FIG. 5.

FIG. 6 illustrates in schematic detail the interconnection of the system shown in FIG. 5. The interconnection of the system at the Chicago location is identical to the Chicago-based system shown in FIG. 3, and thus like numerals will be utilized for like and corresponding parts. In addition, portions of the Los Angeles-based system correspond to portions of the Chicago-based system, and thus prime numerals will be utilized for like and corresponding parts at the Los Angeles location. It will be understood that identical acoustic coupling systems according to the invention will be installed at all communications processors to be serviced.

Referring to FIG. 6, at the Chicago location, the acoustic coupler 46 is connected to the set of terminals 68A–G by cable 69 in the same manner as shown in FIG. 3. Terminal A is connected via lead 74 and through diode 76 to the relay coil 78. The relay coil 78 may be energized to operate the relay switch element 82 in the manner previously described in order to transmit the digital signals transmitted from a remote data terminal to the input of the computer processing system 40. The output of the computer processing system 40 is connected through lead 94, resistor 92 and lead 90 to terminal 68B. Terminal 68B is connected to terminal 62 which is the input to the acoustic coupler. Terminal 66 of the acoustic coupler 46 is connected through terminal 68C to circuit ground. Terminals 68D, E, F and G are left unconnected at the Chicago location. Terminal 68E is connected to the second relay coil 102. As no current is applied to terminal 68E, the relay coil 102 is deenergized and the switch elements 106, 108 and 110 are in the illustrated open positions.

Thus, the keyboard 138 of the teletype 44 at the Chicago location is connected through the switch element 106, contact 114, contact 118, and switch element 108 to the switch element 82. Switch element 82 is open and closed in accordance with the state of operation of the keyboard of the remote data terminal in the manner previously described. The printer 142 of the teletype 44 is connected via lead 140, switch element 110, contact 122, lead 132 and lead 94 to the output of the computer processing system 40. Thus, the printer 142 prints the output generated from the computer processing system 40. Operation of the system as shown in the Chicago location is identical to the previously described operation of the system shown in FIG. 3.

The handset 60 of the telephone set 48 is coupled to the acoustic coupler 46 in the manner previously disclosed. The telephone set 48 is connected by a telephone link to the telephone set 182 located at the Los Angeles location. The handset 200 of the telephone set 182 is coupled to the acoustic coupler 184. An important aspect of the present invention is that the operators at the Chicago and Los Angeles locations may pick up the handsets 60 and 200 and carry on a conversation in order to clearly define the problems existing at the Chicago location. The present system thus enables the dual function of voice communication and selective control of the computer processing system by a remote data terminal.

Figure 4:
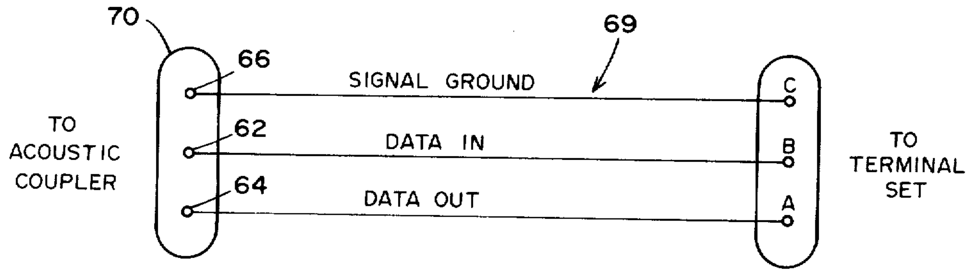
FIG. 4 is a representation of the electrical cable utilized to interconnect an acoustic coupler with the present system in the manner shown in FIG. 3.

The acoustic coupler 184 is connected to terminals 68C′, F′ and G′ in the manner illustrated. Additionally, a shorted connection is made between terminals D′ and E′ of the set of terminals 68′ at the Los Angeles location. In order to prevent human error in connecting the acoustic coupler 184 in the desired manner, a cable connector 202 shown in FIG. 7 is provided for use by the operator at the Los Angeles location. Cable connector 202 is configured in the manner illustrated so that it may only be connected to the desired terminals, and cannot be connected to terminals A' and B'. The cables shown in FIGS. 4 and 7 are distinctly marked so that an operator may choose between the cables when it is desired to hook up an acoustic coupler in one of the two modes of operation.

The acoustic coupler 184 used in this instance is wired to operate the data station 188. This may be a different wiring set (i.e., current interface) than that used for the application of coupler 46 (voltage interface). The coupler 184 is wired in this case according to the characteristics of the data station 188, rather than to match circuitry of the relay network and digital processor.

At the Los Angeles location, the terminal 68A', which is connected to the first relay 78' through diode 76' is open and thus the relay coil 78' is deenergized and the switch element 82' is in the illustrated open position. The terminal 68B' is also open and thus output provided from the computer processing system 190 via lead 94' through the resistor 92' is applied to an open circuit. Terminal 68C' connects the acoustic coupler 184 to circuit ground via lead 80'. Terminals 68D' and E' are shorted, such that positive voltage applied to terminal 98' is applied through the relay coil 102' and through the lead 104' to circuit ground. The relay coil 102' is thus energized such that the switch elements 106', 108' and 110' are closed in the illustrated manner. Hence, the input of the acoustic coupler is connected via terminal F' through lead 124', contact 112', switch element 106' and lead 136' to the keyboard 204 of the teletype 188. The output of the acoustic coupler 184 is connected to terminal 68G' and is connected through lead 130', contact 120', switch element 110' and lead 140' to the printer 206 of the teletype 188.

An important aspect of the invention is that the input of the computer processing system 190 is connected through switch element 82', switch element 108' and contact 116' to circuit ground, or to another suitable terminal to simulate the keyboard in an idle state. This allows the computer processing system 190 to operate as if the teletype 188 were still connected to the input thereof, while completely disconnecting the teletype 188 from the input of the computer processing system 190. The keyboard 204 of the teletype 188 is thus connected to the input of the acoustic coupler 184, while the printer 206 is connected to the output of the acoustic coupler 184. The operator at the Los Angeles station may then operate selected keys on the keyboard 204 and digital signals are applied to the acoustic coupler 184. The signals are converted to tone signals and are supplied through the mouthpiece of the handset 200 to the handset 60 at the Chicago location. The tone signals are converted in the acoustic coupler 46 to electrical digital signals and are applied through terminal 64 and lead 74 to relay coil 78. The switch element 82 is then opened and closed in accordance with the transmitted digital signal in order to input the desired information to the computer processing system 40.

In response thereto, the computer processing system 40 generates output electrical signals on lead 94 which are applied through resistor 92 and terminal 62 to the input of the acoustic coupler 46. The electrical signals are converted to tone signals and are applied through the mouthpiece of the handset 60 and over the telephone link between Chicago and Los Angeles to the handset 200. The tone signals are coupled to the acoustic coupler 184 and are converted into electrical digital signals. The electrical digital signals are applied to terminal 68G' and through lead 130', switch element 110' and through lead 140' to the printer 206, wherein the desired data is printed out for visual inspection by the operator. In this manner, the operator at the Los Angeles location may control the operation of the remote computer processing system 40 in an effort to diagnose any troubles therein. Likewise, training of a trainee may be accomplished by use of the teletype 188 at the Los Angeles station by utilizing the computer processing system 40 at the Chicago location.

When the present invention is incorporated into each of a plurality of communication processors, each of the processors has a capability of being acoustically coupled through a conventional telephone link to a remote data terminal for diagnosis. In addition, each of the communication processors may be interconnected in a second mode by use of a special cable such that the teletype is disconnected from the computer and is coupled through the telephone for use as a remote data terminal for diagnosing trouble at a remote communications processor. In addition, in either mode of operation of the present system, operators at remote stations may at any time audibly communicate with each other over a telephone link in order to more clearly define the existing problems and then may couple through the telephone link to enable transmission of digital information for diagnostic tests and the like.

While the present invention has been particularly described in connection with communications processors, it will be understood that the invention may also be used with other processor systems wherein it is desirable to enable remote operation of the processor.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A data station comprising:

a data terminal having input apparatus and an output display, a computer system for receiving input signals from said input apparatus and for controlling the operation of said output display, means for coupling said input apparatus and output display through a conventional telephone channel to a remote data terminal, means selectively operable in conjunction with said coupling means for interrupting the connections between said computer system and said input apparatus of said data terminal, means for substituting an alternate input connection to said computer system to simulate the impedance of said data terminal in an inactive mode to prevent interruption of the operation of said computer system, and means for coupling said disconnected data terminal through a conventional telephone channel to input and receive data to and from a remote computer and to a remote data terminal.

2. A communication processor station comprising:

teleprinting means having input apparatus for generating digital signals and further having an output display, a digital communication processor computer for receiving said digital signals and in response thereto controlling the operation of said output display, first and second switch means connected between said input apparatus and said computer, third switch means connected between said computer and said output display, an acoustic coupler having transducers for receiving the handset of a telephone set, connecting structure having first means for connecting said acoustic coupler to said first switch and to said output display and having second means for connecting said acoustic coupler to said second and third switches, said acoustic coupler when connected through said first means to said first switch and said output display being operable to direct digital signals transmitted from a remote terminal through the telephone lines to said computer and to said output display and further operable to direct digital data from the computer through the telephone lines to the remote terminal, said acoustic coupler when connected through said second means to said second and third switches being operable to direct digital signals from said input apparatus through the telephone lines to a remote station and being further operable to direct digital signals from the remote station through the telephone lines to operate said output display.

3. The data station of claim 2 wherein said first switch comprises a relay operable in response to said digital data transmitted from said remote terminal.

4. A communications station comprising:

a teleprinter having an input keyboard and an output printer, a digital communication processor computer operable to receive digital signals from said keyboard and to operate said output printer, a first relay having a relay coil connected between circuit ground and a first terminal and having a switch element connected between said input keyboard and said computer, a connecting lead interconnecting said computer and said output printer to a second terminal, a second relay having a selectively operable relay coil and including second, third and fourth switch elements, said second switch element connected between said input keyboard and said computer and being operable to disconnect said input keyboard and said computer and to connect said input keyboard to a third terminal, said third switch element connected between said input keyboard and said computer and being operable to disconnect said input keyboard and said computer and to terminate said computer to circuit ground, said fourth switch element connected between said computer and said output printer and operable to disconnect said computer from said output printer and to connect said output printer to a fourth terminal, and an acoustic coupler having a first transducer for transducing digital signals into audio signals and a second transducer for transducing audio signals into digital signals, said acoustic coupler operable to receive the handset of a conventional telephone set and further including input and output terminals operable for being connected to said first and second terminals to enable coupling of said teleprinter and computer to a remote teleprinter, said input and output terminals of said acoustic coupler also being operable for being connected to said third and fourth terminals to enable connection of only said teleprinter to a remote data station.

5. A communication processor station comprising:

teleprinting means having input apparatus for generating digital signals and further having an output display, a digital communication processor computer for receiving said digital signals and in response thereto controlling the operation of said output display, first and second switch means connected between said input apparatus and said computer, third switch means connected between said computer and said output display, a selectively energized relay coil for controlling said second and third switches, an acoustic coupler having transducers for receiving the handset of a telephone set, means for connecting said acoustic coupler to said first switch and to said output display or to said second and third switches, means for energizing said relay coil when said acoustic coupler is connected to said second and third switches, said acoustic coupler when connected to said first switch and said output display being operable to direct digital signals transmitted from a remote terminal through the telephone lines to said computer and further operable to direct digital data from the computer through the telephone lines to the remote terminal, said acoustic coupler when connected to said second and third switches being operable to direct digital signals from said input apparatus through the telephone lines to a remote terminal and being further operable to direct digital signals from the remote terminal through the telephone lines to operate said output display.

* * * * *